June 23, 1953  H. F. WAHL  2,643,012
APPARATUS FOR THE TRANSPORTATION OF PULPWOOD AND THE LIKE
Filed May 23, 1950  8 Sheets-Sheet 1
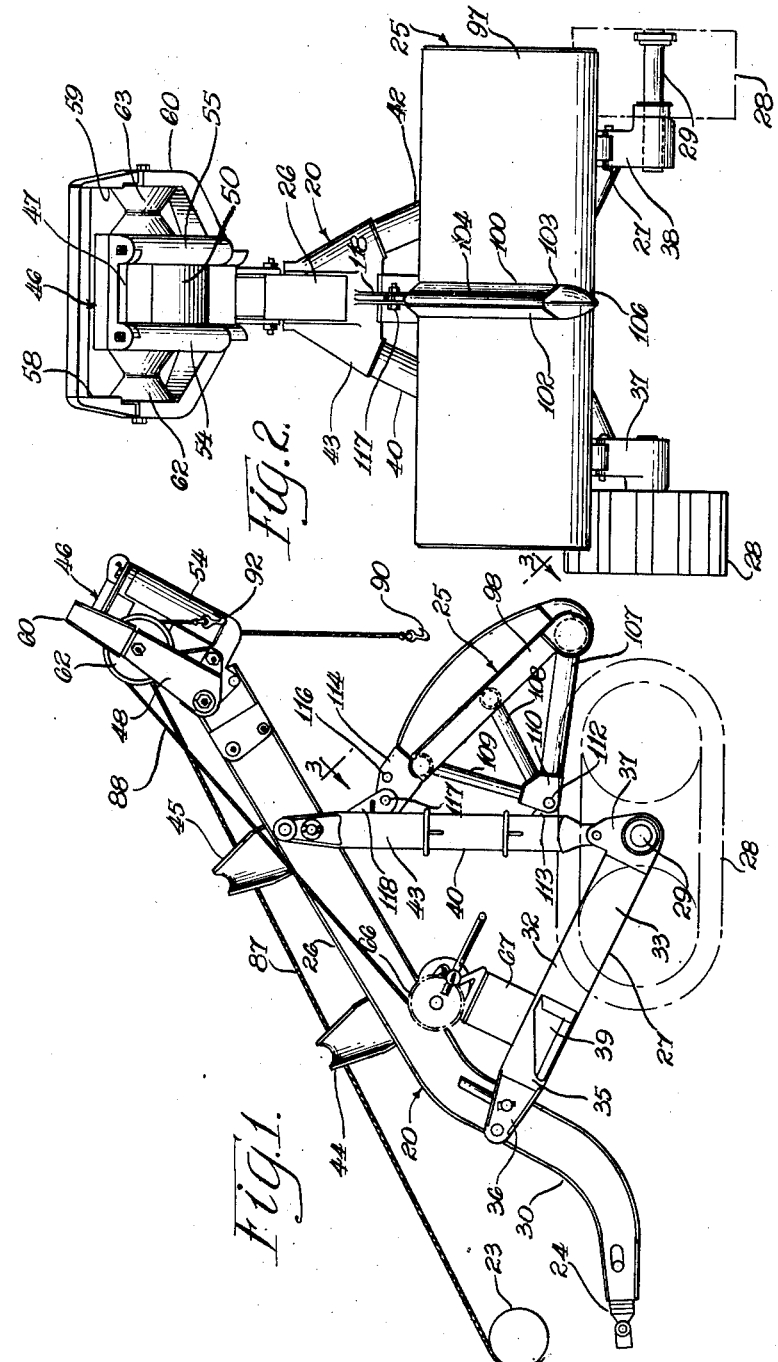
INVENTOR.
Harold F. Wahl
BY Albert G. McCaleb
Attys.

June 23, 1953          H. F. WAHL          2,643,012
APPARATUS FOR THE TRANSPORTATION OF PULPWOOD AND THE LIKE
Filed May 23, 1950          8 Sheets-Sheet 2
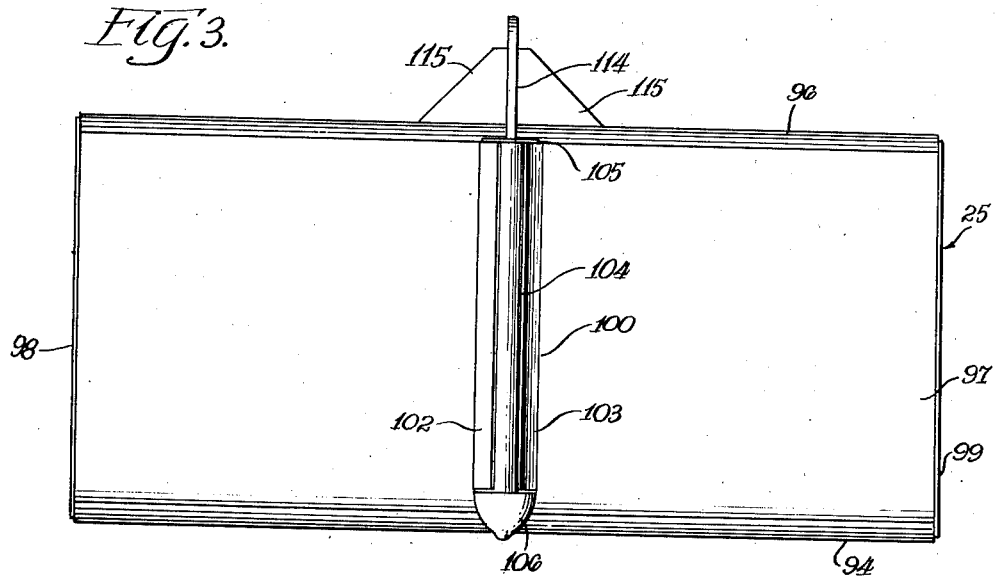
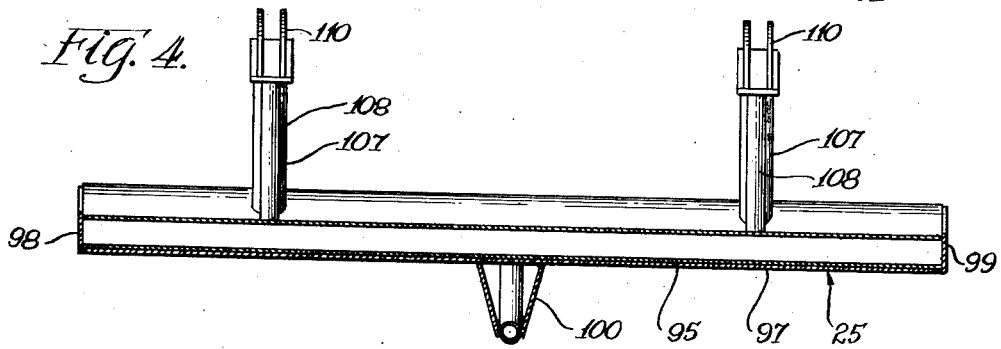
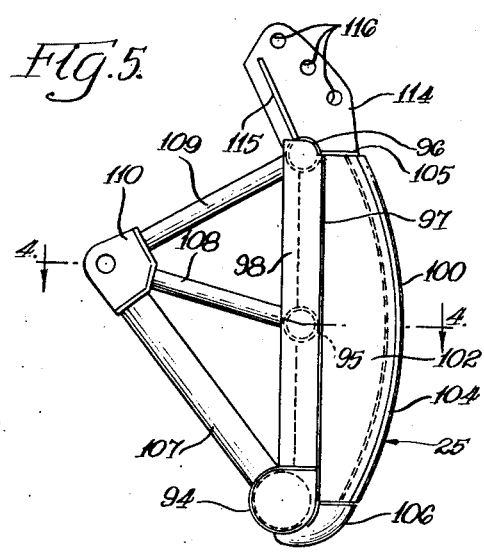
INVENTOR.
Harold F. Wahl
BY Albert G. McCaleb
Attys.

June 23, 1953  H. F. WAHL  2,643,012
APPARATUS FOR THE TRANSPORTATION OF PULPWOOD AND THE LIKE
Filed May 23, 1950  8 Sheets-Sheet 3

INVENTOR.
Harold F. Wahl
BY Albert G. McCaleb
Attys.

June 23, 1953  H. F. WAHL  2,643,012
APPARATUS FOR THE TRANSPORTATION OF PULPWOOD AND THE LIKE
Filed May 23, 1950  8 Sheets-Sheet 4

INVENTOR.
Harold F. Wahl
BY Albert G. McCaleb
Attys.

June 23, 1953  H. F. WAHL  2,643,012
APPARATUS FOR THE TRANSPORTATION OF PULPWOOD AND THE LIKE
Filed May 23, 1950  8 Sheets-Sheet 5

INVENTOR.
Harold F. Wahl
BY Albert G. McCaleb
Attys.

June 23, 1953  H. F. WAHL  2,643,012
APPARATUS FOR THE TRANSPORTATION OF PULPWOOD AND THE LIKE
Filed May 23, 1950  8 Sheets-Sheet 6

INVENTOR.
Harold F. Wahl
BY Albert G. McCaleb
Attys.

June 23, 1953 H. F. WAHL 2,643,012
APPARATUS FOR THE TRANSPORTATION OF PULPWOOD AND THE LIKE
Filed May 23, 1950 8 Sheets-Sheet 7

INVENTOR.
Harold F. Wahl
BY Albert G. McCaleb
Attys.

June 23, 1953  H. F. WAHL  2,643,012
APPARATUS FOR THE TRANSPORTATION OF PULPWOOD AND THE LIKE
Filed May 23, 1950  8 Sheets-Sheet 8

INVENTOR.
Harold F. Wahl
BY Albert G. McCaleb
Attys.

Patented June 23, 1953

2,643,012

UNITED STATES PATENT OFFICE 2,643,012

APPARATUS FOR THE TRANSPORTATION OF PULPWOOD AND THE LIKE

Harold F. Wahl, Portland, Oreg., assignor to Hyster Company, Portland, Oreg., a corporation of Oregon Application May 23, 1950, Serial No. 163,656

4 Claims. (Cl. 214—85.1)

This invention relates to apparatus for the transportation of pulpwood and the like, and more particularly to such apparatus which is adapted to use for carrying heavy loads over rugged terrain, such as that encountered where the trees are felled or at the point of starting a river drive.

The logging of small trees for pulpwood presents problems differing materially from those encountered in the logging of large trees to be sawed into lumber. For example, the movement of any sizeable load of the small wood entails the handling and hauling of many small pieces instead of a small number of large logs. The yield per acre of the small trees being normally less than that for larger trees, there is the additional problem of gathering a sizeable load of the small wood.

Such problems have led to the development of a logging system for gathering pulpwood and in which the small trees are trimmed and cut to preselected short lengths at the place of felling. The wood thus cut is piled in racks as closely as possible to the place of cutting. The remaining problem is one of economically and efficiently handling and hauling the cut and stacked wood.

In comprehension of the latter problem, I have provided apparatus which is not only adapted to the hauling of large quantities of bundled and cut wood under adverse operating conditions, but which is adapted to the secure bundling of stacked wood, as well as the loading of such bundled wood for hauling and its unloading at a destination.

One of the objects of my invention is to adapt a logging arch of the type used in the logging of heavy timber to the hauling of relatively large quantities of bundled short lengths of pulpwood.

It is further within the purview of this invention to provide pulpwood handling and hauling apparatus suited to operation with a tractor and a power driven winch for purposes including the bundling, loading, hauling and unloading of relatively short lengths of pulpwood and the like.

As another object, the invention comprehends the provision of pulpwood hauling apparatus embodying a load hauling apron having a load supporting surface sloped to facilitate loading and unloading; the slope, height and disposition of the apron being such that it may also be used in somewhat the manner of a bulldozer during unloading operations.

My invention further comprehends the provision of handling and hauling apparatus for pulpwood and the like, which apparatus embodies a boom extending to a position above a load supporting surface and equipped with a plurality of fairleads, whereby a plurality of load units are jointly carried by the surface and cables extending through the fairleads.

Another object of this invention is to provide hauling apparatus for bundled pulpwood and the like and which is constructed and arranged to afford stability of operation on rough and rugged terrain, even though the loads vary considerably in position and weight.

The load hauling apparatus of this invention comprehends a vehicle of the logging arch type mounted on truss wheels and having a load supporting apron carried at a position such that the truss wheels are free to swing through a wide range of positions without interference from the apron during passage of the vehicle over obstacles and rough terrain.

Other objects and advantages of the invention will be apparent from the following description and the accompanying drawings in which similar characters of reference indicate similar parts throughout the several views.

Referring to the eight sheets of drawings,

Figs. 1 and 2 are respectively side and rear elevational views of apparatus embodying a preferred form of my invention;

Fig. 3 is a plan view of a portion of the structure shown in Figs. 1 and 2, wherein the view is taken substantially as indicated by a line 3—3 and accompanying arrows in Fig. 1;

Fig. 4 is a sectional view of the portion of the structure shown in Figs. 3 and 5, and wherein the section is taken substantially as indicated by a line 4—4 in Fig. 5;

Fig. 5 is an end elevational view of the portion of the structure shown in Figs. 3 and 4;

Figure 12:
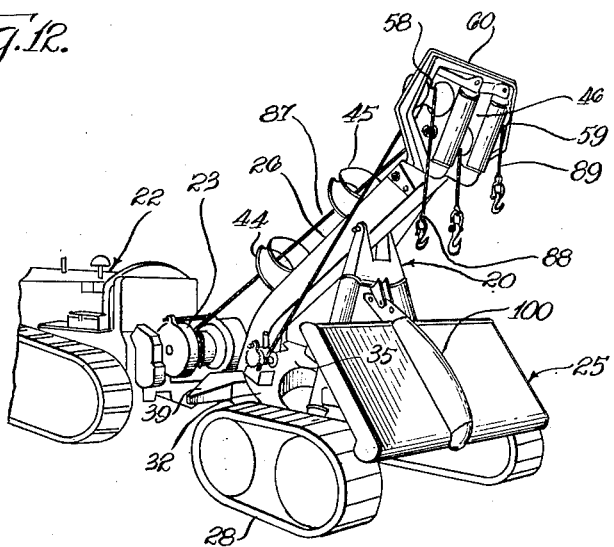

Fig. 12 is a perspective view taken from the rear and to one side of the apparatus illustrated in Figs. 1 to 10 inclusive, and showing the apparatus as it appears when unloaded and in its coupled and operative relationship to a tractor of the track laying type which is equipped with a power driven winch; and Figs. 13 to 18 inclusive are successive perspective views of the apparatus illustrated in Figs. 1 to 10 inclusive and showing steps of loading, unloading and utilizing the disclosed apparatus for the transportation of pulpwood and the like.

Considered generally, the exemplary embodiment of my invention which is disclosed herein for illustrative purposes, comprises a logging arch or fairlead trailer 20 of the type shown in United States Letters Patent No. 2,305,630 issued to D. J. McNeil, December 22, 1942, for Logging Equipment, with additions to and variations made in that apparatus to adapt it particularly to the handling and hauling of bundled pulpwood which has been cut to relatively uniform short lengths. In the present adaptation, as well as that shown in the aforementioned patent, the apparatus comprehends the use of a tractor 22 preferably of the track laying type, which is equipped with a winch 23 of the power driven type actuated under the control of an operator from the tractor prime mover. For tractive and load supporting and balancing purposes, the load hauling vehicle is connected to the tractor through a hitch 24, shown in Figs. 1, 7, 8 and 18. In the structure herein depicted, one of the additions made to the logging arch or fairlead trailer which distinguishes it from that shown in the aforementioned patent, and contributes to the adaptation of the structure to the handling and hauling of bundled pulpwood and the like, is an apron 25.

The logging arch or fairlead trailer 20, which comprises a basic part of the load hauling vehicle herein disclosed, includes a boom 26 supported by an underframe 27; the underframe being supported for movement by ground wheels 28 which, for the carrying of heavy loads as herein contemplated, are preferably of the truss wheel type and are mounted for rotational movement relative to the underframe on axle studs 29. At the forward end, the boom 26 is extended and curved to provide a drawbar 30 which is connected to the tractor through the hitch 24 and, when thus connected, assumes a level comparable to that of the axle studs 29.

Figure 14:
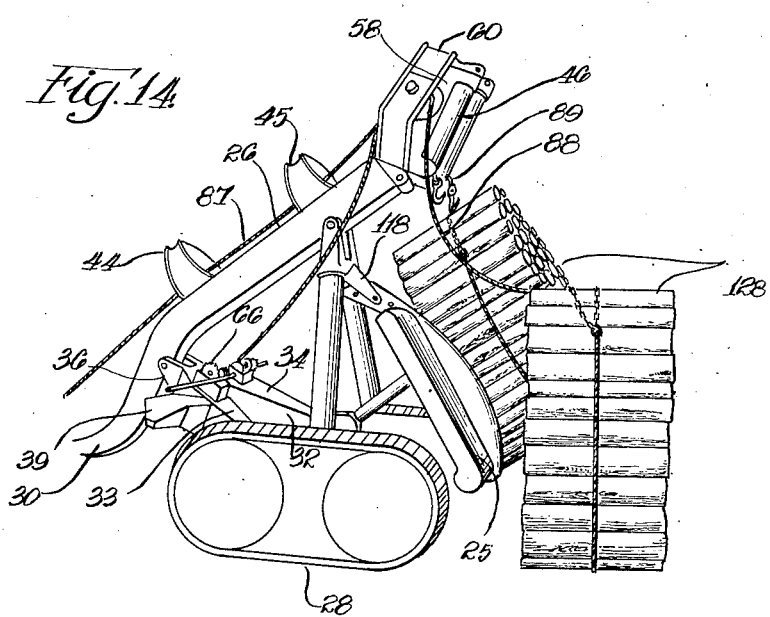

The underframe 27, in the disclosed vehicle, includes an arch-type support member 32 having side leg portions 33 and 34 which extend between the wheels 28 and are connected at their forward ends by an intermediate connecting portion 35. At the mid-portion of its forward end, the arch-type support member 32 has thereon a yoke 36 which straddles and is secured to the boom 26 at the rear end of the drawbar 30. In my disclosed structure, the arch-type support member 32 assumes an angular position with the side leg portions 33 and 34 sloping downwardly toward the rear, with end brackets 37 and 38 secured thereto and carrying the inner ends of the axle studs 29. As shown in Figs. 1, 12 and 14, guards 39 project outwardly on opposite sides of the arch-type support member and are rigidly secured thereto at a distance forwardly of the wheels 28 to prevent or limit fouling of the wheels by brush, limbs and the like.

Side trusses 40 and 42 extend upwardly and inwardly from the brackets 37 and 38 at the rear ends of the legs 33 and 34 and are secured thereto at their lower ends. At their upper ends, the trusses 40 and 42 are secured to a yoke 43 which straddles and is secured to the boom 26 at a position rearwardly of the vehicle from the connection of the arch-type support member to the boom. With the parts of the underframe thus constructed and disposed, the boom extends upwardly toward the rear of the vehicle to an elevated position considerably above the wheels 28 and to the rear of the underframe. At spaced positions along the top of the boom, hollow cable guards 44 and 45 are secured to the top surface of the boom.

In order to provide a rugged structure with a minimum of weight, the boom, drawbar and arch-type support member are made of metal plates secured together by welded seams to produce box-type sections. Also, the side trusses 40 and 42 are preferably made of tubular stock.

Figure 6:
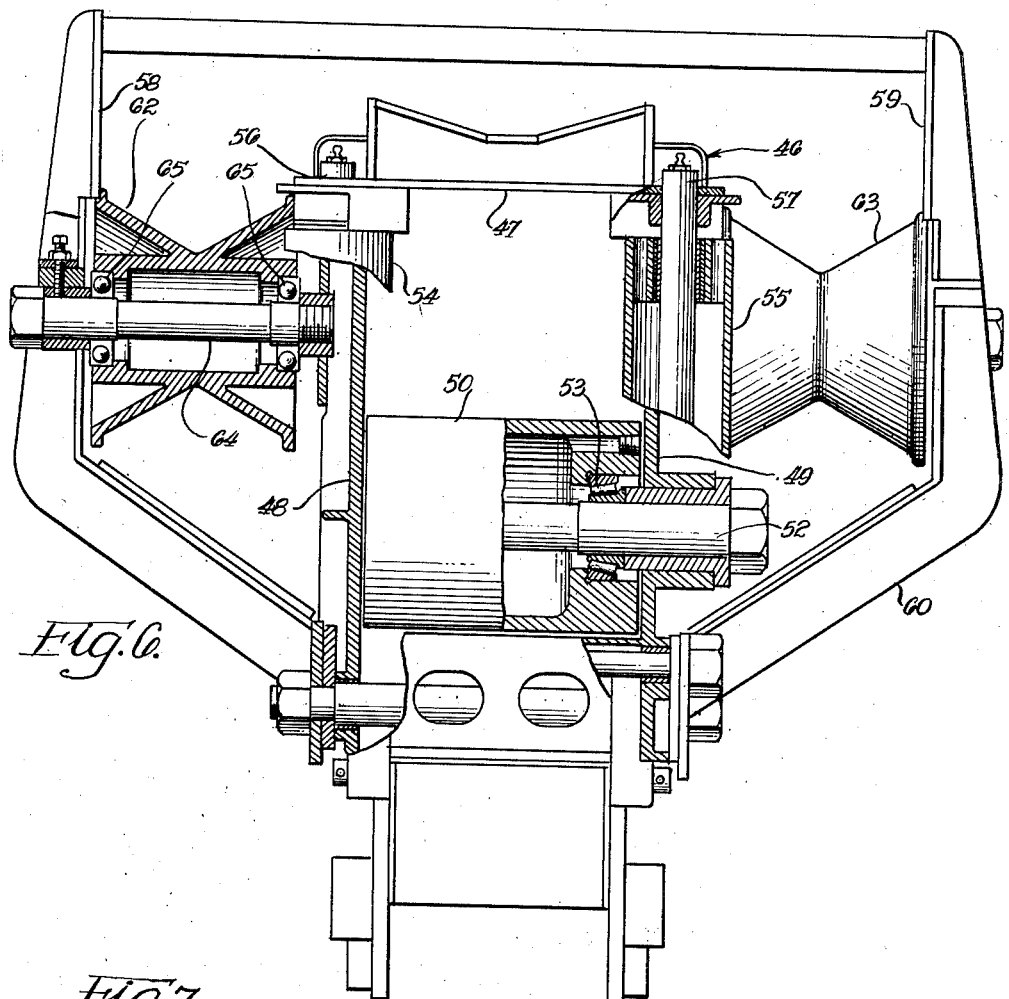
Fig. 6 is an enlarged fragmentary front elevational view of a portion of the structure shown in Fig. 2 wherein parts are broken away and depicted in section to show internal details.

At the upper end of the boom, a main fairlead 46 is secured thereto. This main fairlead has a frame 47 of generally rectangular shape which includes side plates 48 and 49, between which a roller 50 is supported for rotation relative to a shaft 52 by bearings such as 53. Rearwardly of the roller 50, side rollers 54 and 55 are supported for relatively free rotation by shafts 56 and 57, which shafts are also carried by the frame 47. In the disclosed structure, auxiliary fairlead frames 58 and 59 are mounted on opposite sides of the main fairlead 46. A frame 60 is secured to the lower end of the frame 47 and extends laterally from the frame 47, as well as across the top thereof and provides outer supports for auxiliary fairlead rollers 62 and 63. As shown in Fig. 6, rollers 62 and 63 are preferably of the V-type and are supported for relatively free rotation on shafts such as 64 which extend between the side plates 48 and 49 of the frame 47 and substantially parallel side portions of the frame 60. In the disclosed structure, bearings 65 support the rollers 62 and 63 relative to their respective shafts.

Figure 9:
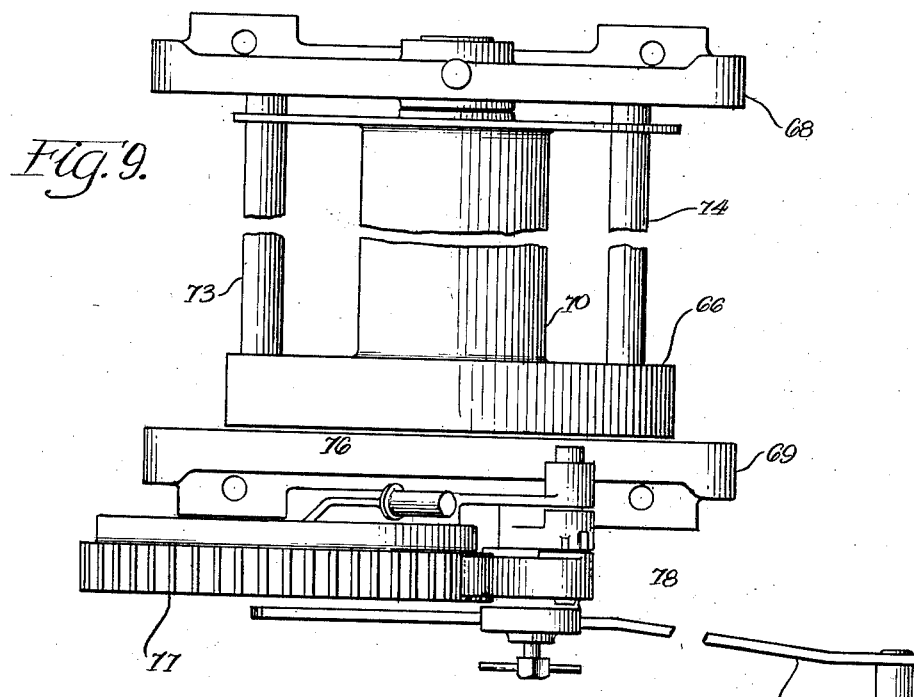
Figs. 9 and 10 are respectively top plan and side elevational views, drawn to an enlarged scale, which illustrate a preferred type of manually operated winch utilized with the disclosed structure, as shown in Figs. 1 and 12 to 18 inclusive.
Figure 10:
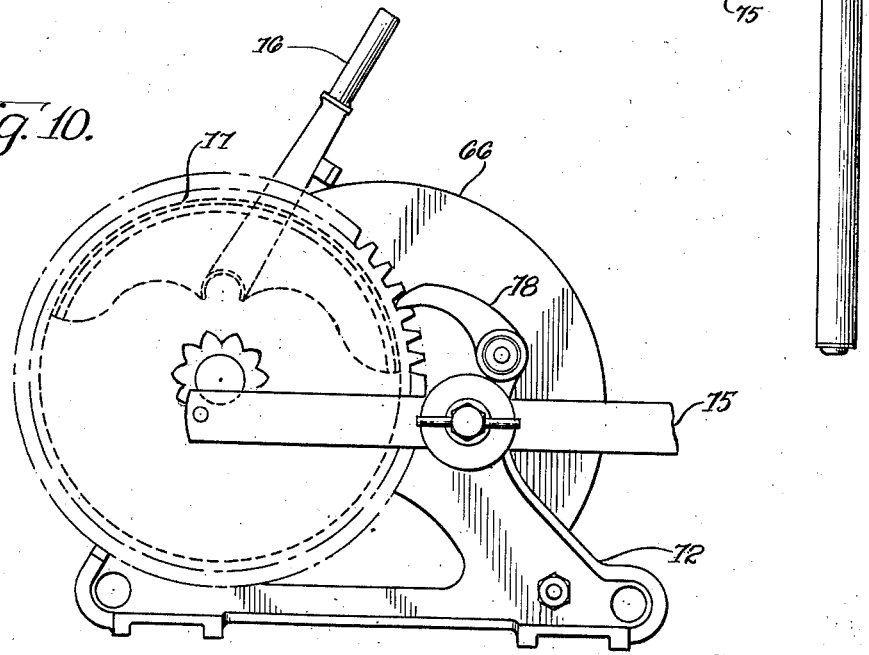

At positions near the lower end of the boom 26 and at a level for convenient manual operation, auxiliary winches such as 66 (Figs. 1, 9 and 10) are mounted on supporting bases 67 which are secured to the upper surfaces of the arch-type support member 32. As shown in Figs. 9 and 10, each of the winches 66 includes an end support 68 and a gear housing 69 between which a winch drum 70 is supported for rotational movement. The end support 68 and the gear housing 69 are supported in spaced relationship by a base frame 72 which includes cross trusses 73 and 74. Within the gear housing 69, a train of gears is provided for the actuation of the winch drum 70 from a crank-type handle 75. The housing 69 also preferably includes a brake adapted to be actuated by a brake lever 76 for controlling the movement of the winch drum when it is released with a load attached thereto. Additionally, a gear 77 is mounted exteriorly of the gear housing 69 and is adapted to be engaged by a pawl 78 to lock the winch drum in a fixed load supporting position; the gear 77 being connected to the winch drum through gears inside of the gear housing.

Figure 7:
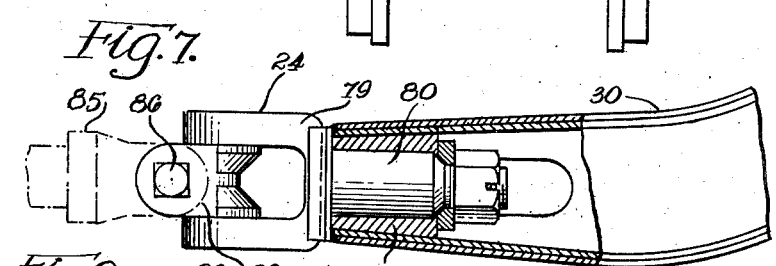
Figs. 7 and 8 are respectively fragmentary side and top elevational views, drawn to an enlarged scale, of a portion of the structure of Fig. 1.
Figure 8:
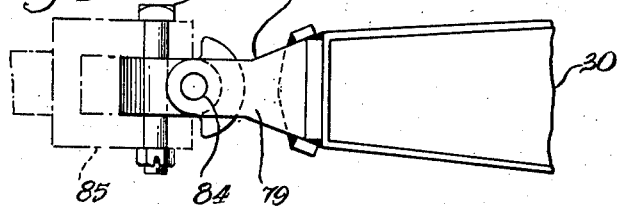

As illustrated in Figs. 7 and 8, my preferred form of hitch 24, through which the drawbar 30 is connected to the tractor includes a yoke 79 having a stud shaft 80 thereon which is journalled in a bearing block 82 secured within the end of the drawbar. A swivel block 83 is supported relative to the yoke 79 by a cross pin 84 having an axis transverse to that of the stud shaft 80. With this arrangement of parts, a coupling link 85 on the tractor is connected to a projecting end portion of the swivel block by fastening means, such as a bolt 86 which extends through aligned openings in the coupling link and projecting end portion of the swivel block.

When coupled to a tractor in the manner described, a main winch line or cable 87 extends from the power driven winch 23 through the cable guards 44 and 45 and through main fairlead 46; the main winch line or cable 87 passing over the roller 50 and between the side rollers 54 and 55. In addition to the main winch line 87, auxiliary winch lines 88 and 89 extend from the drums of the auxiliary winches 66 along opposite sides of the boom and through the auxiliary fairlead frames 58 and 59, passing over the V-type rollers 62 and 63 thereof. At their free ends, the main and auxiliary winch lines 87, 88 and 89 are respectively connected to hooks 90, 92 and 93.

The apron 25 is secured to and supported by the underframe 27 at a position at the rear of the vehicle, below the fairleads and above the wheels. This apron, in the disclosed structure, and as shown in Figs. 1 to 5 inclusive, has tubular cross beams 94, 95 and 96 extending laterally there across in spaced and substantially parallel relationship to one another. A top plate 97 covers the surfaces of the cross beams and is secured thereto as by welding, to provide an upper and substantially flat load supporting surface. Preferably, end plates 98 and 99 are welded to the opposite ends of the cross beams and the top plate to provide end covers.

For the purpose of dividing the upper load supporting surface of the apron 25 into laterally separated load carrying portions, and to provide a lateral brace tending to locate and prevent lateral shifting of loads thereon, a vane 100 extends longitudinally along the mid-portion of the top plate and projects outwardly therefrom. This vane, in my disclosed structure comprises opposed side plates 102 and 103 secured, as by welding, to the outer surface of the top plate 97; the opposed edges of the side plates 102 and 103 being substantially parallel and the surfaces thereof converging away from the top plate, and the outer edges thereof being secured to a tubular rib 104. At the front end, the vane is closed by a cover plate 105, while at its other end it is covered by a formed end cap 106.

As a main load carrying support for the apron 25, it has at its opposite ends tubular trusses 107, 108 and 109 which have ends secured to the cross beams 94, 95 and 96 respectively. At their ends, the trusses 107, 108 and 109 converge and are secured in closely spaced relationship to end brackets 110, which end brackets are in turn secured by fastening means, such as pins 112, to support brackets 113 on the side trusses 40 and 42 of the trailer 20. As herein depicted, the axes of the pins 112 which support the apron relative to the side trusses are aligned and provide an axis of swinging movement for the apron, relative to which the position or slope of the apron may be adjusted.

At the front end of the apron and at a position aligned with the vane 100, a projecting plate 114 is secured thereto and extends outwardly from the cross beam 96. Gusset plates 115 which are secured to the projecting plate 114 and to the cross beam 96 on opposite sides of the projecting plate 114 serve as braces for the latter plate. A series of openings 116, disposed in spaced relationship to one another and in substantially concentric relationship to the axis of rotational movement of the apron relative to the pins 112, is provided to afford a series of positions to which the apron may be selectively adjusted. In each such position, the apron is supported by removable fastening means, such as a bolt 117, extending through a bracket 118 secured to the yoke 43. In respect to the mounting and support of the apron 25, it may be observed that in various positions to which that apron is adjusted, the cross beams 94, 95 and 96 are sufficiently spaced from the axis of rotational movement of the wheels that those wheels are free to swing without interference from the apron. As is the case with the underframe, the trusses which support the apron are spaced inwardly of the wheels in an axial direction, so that there is no possibility of interference with the movements of the wheels in passing over obstacles, uneven ground and the like.

Figure 11:
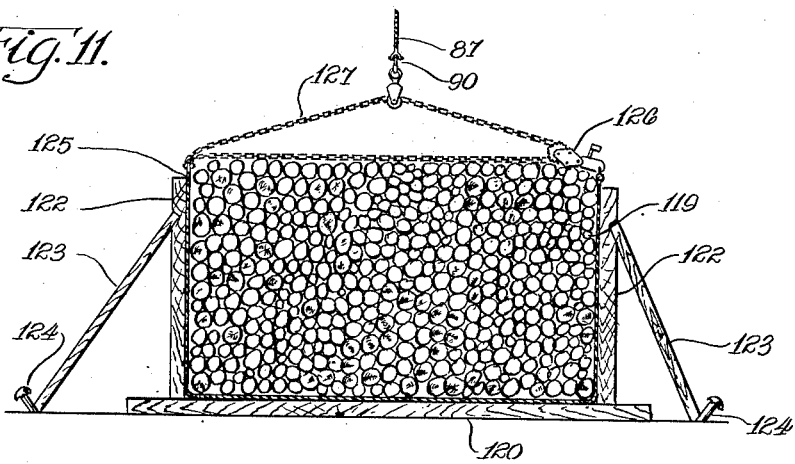
Fig. 11 is a side elevational view depicting a preferred manner of measuring, stacking and binding a bundle of pulpwood or the like in making effective and efficient use of the disclosed apparatus.

In order to facilitate an understanding of the operation, arrangement and structure of the apparatus herein disclosed, as well as to show its aptitudes to operating functions, such as bundling, loading, hauling and unloading, Figs. 11 to 18 are provided as being illustrative of certain salient phases. Although somewhat incidental, Fig. 11 depicts a manner of stacking a quantity of pulpwood cut to relatively uniform short lengths, whereby the quantity is not only measured, but the passage of a bundling sling around the wood is facilitated and the sling can draw the stack into a secure bundle from a point of vantage with the aid of the apparatus herein disclosed.

As shown in Fig. 11, relatively short lengths of pulpwood 119 are stacked in spaced relationship to the ground on stringers 120 and supported at opposite ends by upright posts 122. The posts 122 are supported externally of the stack by braces 123, the lower ends of which are preferably anchored by stakes 124 driven into the ground. With the stack of pulpwood thus supported, a sling 125 may be passed under the stack between the stringers, so as to encompass a considerable portion of the pile, substantially midway between the ends of the pieces. A ratchet mechanism 126 is connected to one end of the sling 125, while a flexible element such as a chain 127 is connected to the other end of the sling and extends through the ratchet mechanism at the top of the pile, whereby pulling force exerted by the winch line 87 which is attached to the power driven winch on the tractor and extends through the main fairlead will draw the sling tightly about the pile and cause it to be formed into a tight bundle, such as 128 in Fig. 13. As the sling 125 is drawn tightly around the bundle, the ratchet mechanism 126 maintains its tightness, so that the bundle will hold until manually and intentionally released.

Figure 13:
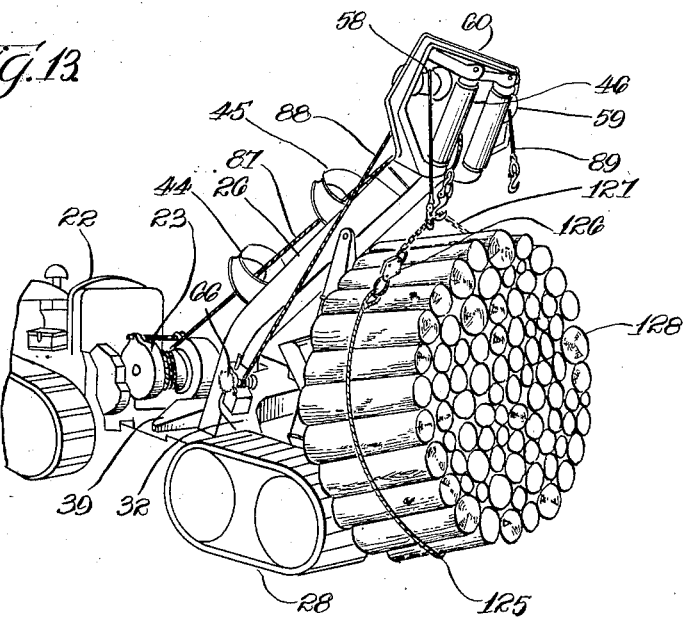

By the continued application of force through the winch line 87 from the power driven winch 23, the tightened bundle 128 is drawn bodily to the rear end of the vehicle and lifted onto the apron 25. When lifted to some extent relative to the apron, one of the auxiliary winch lines, such as 88 in Fig. 13, is connected to the sling, so that force applied therethrough from one of the auxiliary winches will draw the bundle to an approximate side portion of the apron as the raising of the bundle to the apron is completed. When thus positioned, the auxiliary winch is locked, so that the supporting force applied through its winch line supports the bundle on the apron, as illustrated in Fig. 14. The main winch line is then released from the loaded bundle for use in similarly loading the second bundle to the other load supporting side portion of the apron, where that second bundle is also secured in position by the second auxiliary winch line. This again enables the main winch line to be released for further use. It may be observed at this point that the first two bundles which are lifted into side-by-side relationship on the side portions of the apron are supported entirely on and by the load carrying vehicle since the auxiliary winches are mounted thereon.

Figure 15:
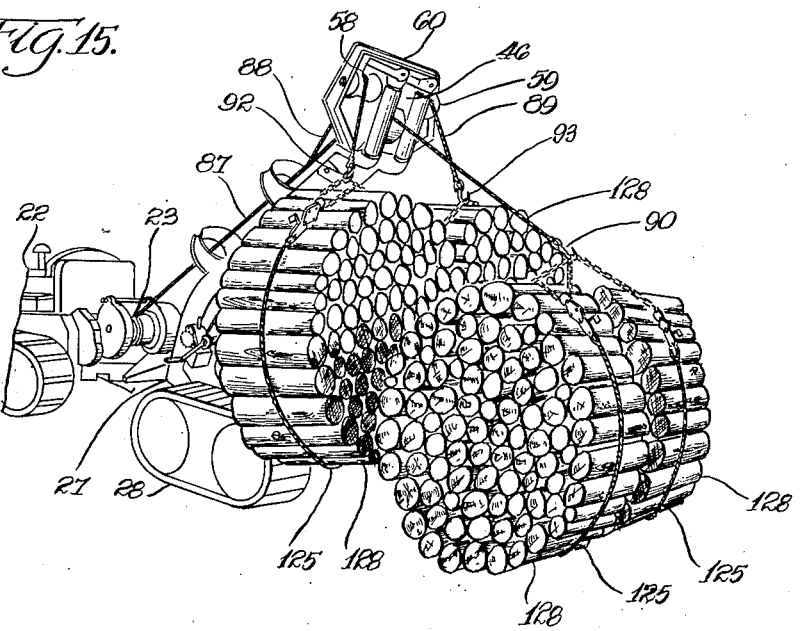
Figure 16:
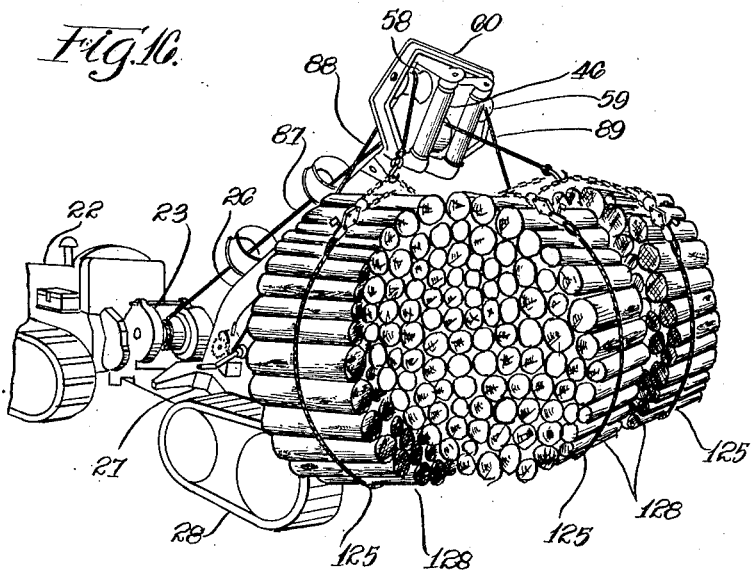

To provide for the hauling of an additional load, additional bundles are bound by separate slings and drawn to the rear of the vehicle upon which the first two bundles have been loaded, as shown in Fig. 15. At this position, the bundles are secured together at the top by their respective chains and are both connected to the hook 90 on the end of the main winch line 87. From this position, the latter two bundles are raised to a carrying position against the originally loaded bundles and supported in that position from the power driven winch on the tractor by the main winch line. The apparatus loaded, as shown in Fig. 16, is ready for movement by the tractor to a desired place. If desirable, in passing over soft ground, the last two bundles to be loaded may be dropped by release of the tension in the main winch as the vehicle is moved across the soft ground. When again on firm ground, the bundles are drawn back to their loaded positions by operation of the power driven winch.

Figure 17:
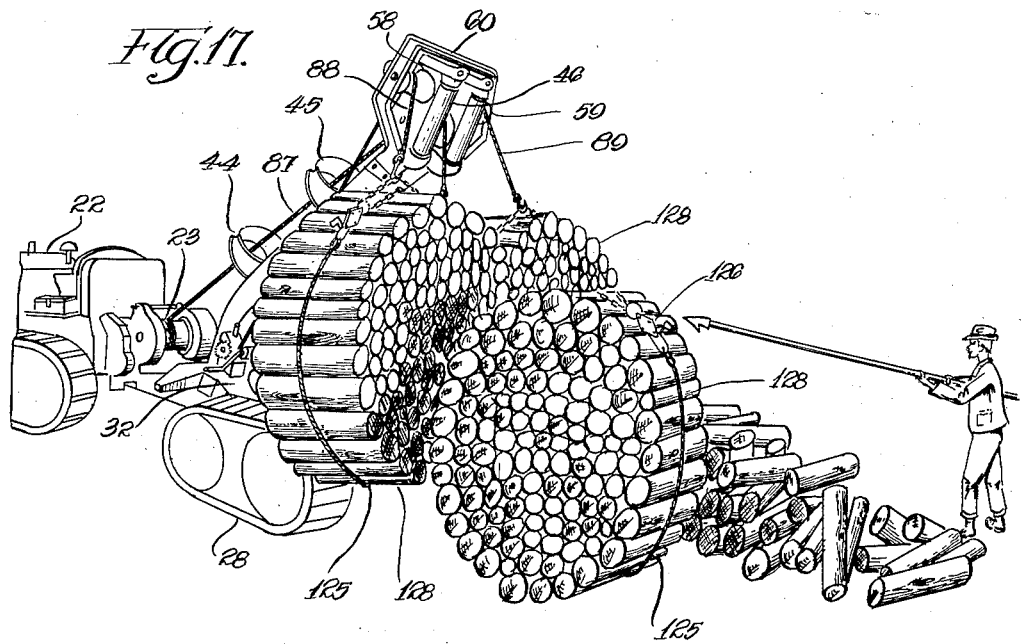
Figure 18:
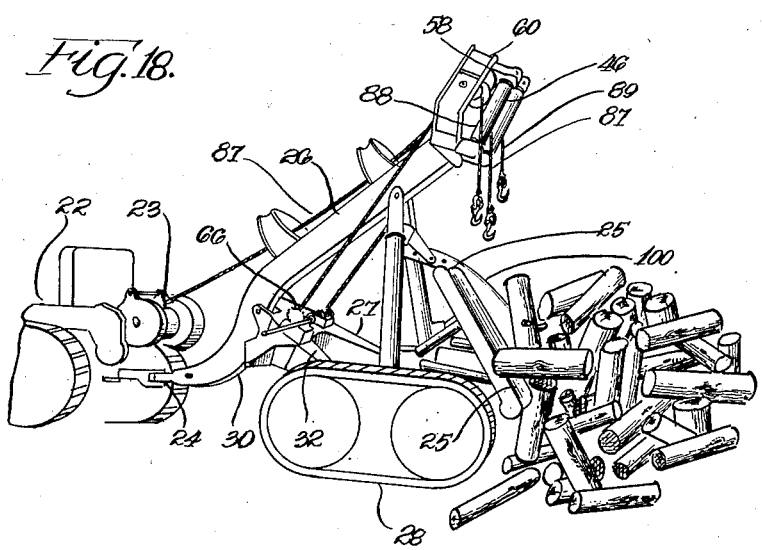

It may be appreciated, as indicated in Fig. 17, that unloading of the bundles from the vehicle may be readily accomplished since the bundles roll or slide off by gravity when the holding force of the respective winch lines is released. The ratchet mechanism 126 on each of the bundle slings is subject to release by an attendant at the unloading position, so that the wood is there released from the bundles and the slings may be returned to the place of loading with the apparatus. With all of the wood released from the bundles, as depicted in Fig. 18, it is a feature of my apparatus that the apron 25 assumes the position such that it is adapted to use for pushing the released wood to a desired place. For example, by manipulation of the load carrying vehicle with the aid of the tractor, the released wood can be pushed down the bank and into a river for the start of a river drive. Such operation will be desirable where the weight of the loaded vehicle would not be supported by the soft ground of the river bank, while the vehicle itself could be moved over that ground.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. Apparatus for use in handling and hauling bundles of pulpwood and the like when used with a tractor having a winch on the rear end thereof, and a line controlled by the winch, and comprising, in combination, a vehicle adapted to trail the tractor and having an underframe structure having a drawbar at the forward end thereof, said underframe structure being supported to the rear of the drawbar by laterally spaced and substantially coaxial wheels, a load supporting apron mounted at the rear of the underframe structure in spaced relationship to the wheels, a boom supported by the underframe structure and extending upwardly and rearwardly relative to the lateral mid-portion of the underframe and to a position above the apron, a main fairlead carried by the boom at a position above the apron, said fairlead opening rearwardly and having rollers for guiding the line from the tractor winch, auxiliary fairleads on opposite sides of the first mentioned fairlead, auxiliary hand operated winches carried by the trailing vehicle at the forward end of the boom in line with the auxiliary fairleads, and load supporting lines extending through the auxiliary fairleads from the auxiliary winches for supporting bundles on the apron, the winch line that extends from the tractor winch through the rollers of the main fairlead being adapted to support additional bundles on top of the aforementioned bundles on the apron.

2. Apparatus for use in handling and hauling bundles of pulpwood and the like when used with a tractor having a winch on the rear end thereof and a line controlled by the winch, and comprising, in combination, an underframe structure having a drawbar at the forward end thereof, said underframe structure being supported to the rear of the drawbar by laterally spaced and substantially coaxial wheels, a load supporting apron mounted at the rear of the underframe structure in spaced relationship to the wheels, the apron sloping downwardly at the rear of the underframe structure and being divided into laterally separated load supporting portions by a projecting fin extending along the mid-portion thereof, a boom supported by the underframe structure and extending upwardly and rearwardly relative to the lateral mid-portion of the underframe and to a position above the apron, a main fairlead carried by the boom at a position above the apron, said fairlead opening rearwardly and having rollers for guiding the line from the winch for loading bundles onto the apron and supporting loaded bundles relative to the apron, auxiliary fairleads on opposite sides of the first mentioned fairlead, auxiliary hand operated winches mounted at the forward end of the boom in line with the auxiliary fairleads, and load supporting lines extending through the auxiliary fairleads from the auxiliary winches.

3. In combination with a tractor having a winch and a hitch at the rear end thereof and a winch line connected to the winch, a load carrying vehicle for hauling bundles of pulpwood and the like and including an underframe having ground wheels mounted on opposite sides thereof, a boom secured to the lateral mid-portion of the underframe and extending upwardly to an elevated position at the rear of the vehicle, a drawbar extending forwardly from the underframe and connected to said hitch, an apron supported by the underframe and sloping downwardly at the rear of the vehicle, said apron having load carrying portions on opposite sides thereof, a main fairlead mounted on the boom above the mid-portion of the apron and having rollers for guiding the winch line, auxiliary fairleads on opposite sides of the main fairlead, auxiliary winches mounted on opposite sides of the boom near the drawbar, and load supporting lines connected to the auxiliary winches and extending through the auxiliary fairleads for assisting in the support and stabilization of bundles on the apron, the winch line extending directly from the tractor winch to the main fairlead for supporting additional bundles on top of those on the apron.

4. Apparatus for use in handling and hauling bundles of pulpwood and the like and comprising a laterally disposed arch member having opposed side leg portions, opposed trusses secured to and extending from the side leg portions, a boom having spaced regions secured to the arch member and to the trusses, a load-carrying apron positioned below one end of the boom, support members for the apron projecting therefrom and having a connection with the trusses near their lower ends, means adjustably tying the apron to the trusses adjacent their upper ends for varying the angle of the apron by a shifting of the apron about the aforesaid connection.

HAROLD F. WAHL.

References Cited in the file of this patent

UNITED STATES PATENTS

| Number | Name | Date |
| --- | --- | --- |
| 1,918,409 | Langdon | July 18, 1933 |
| 1,987,688 | Lamb | Jan. 15, 1935 |
| 2,131,402 | King | Sept. 27, 1938 |
| 2,292,878 | Jarvis | Aug. 11, 1942 |
| 2,305,630 | McNeil | Dec. 22, 1942 |